Figure 1:
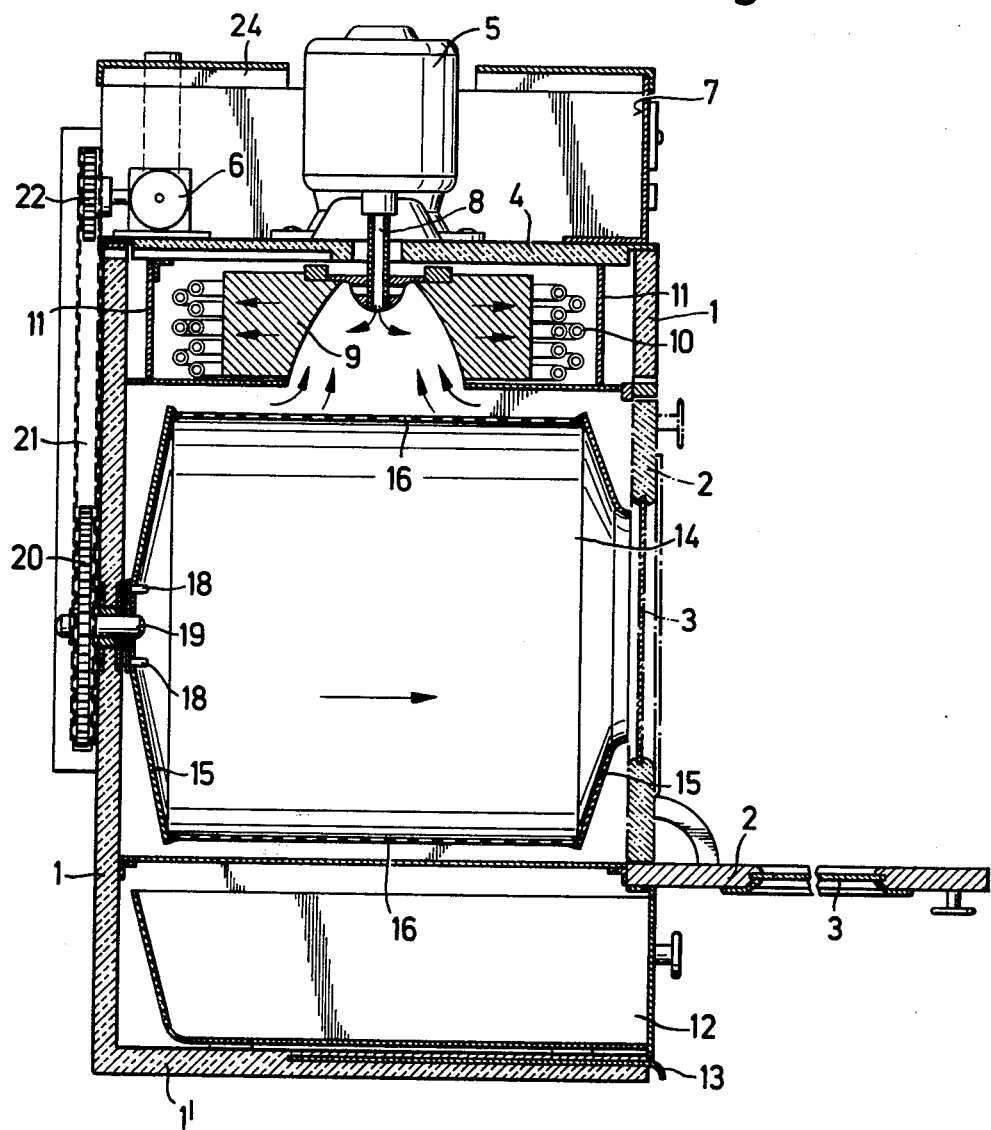

United States Patent [19]

Vogt

[11] 4,203,358
[45] May 20, 1980

[54] DEVICE FOR COOKING FOODSTUFFS

[76] Inventor: Hans Vogt, 8391 Erlau, Passau, Fed. Rep. of Germany

[21] Appl. No.: 924,223

[22] Filed: Jul. 13, 1978

Related U.S. Application Data

[63] Continuation of Ser. No. 724,732, Sep. 20, 1976, abandoned.

[30] Foreign Application Priority Data

Sep. 18, 1975 [DE] Fed. Rep. of Germany ....... 2541718

[51] Int. Cl.$^2$ ............................................. A47J 27/00
[52] U.S. Cl. ...................................... 99/352; 99/446; 34/133
[58] Field of Search ................... 99/352, 348, 359–360, 99/371, 408, 427, 443 R, 443 C, 446, 473; 34/133; 134/94; 219/369–370, 374–375, 381

[56] References Cited

U.S. PATENT DOCUMENTS

| | | | |
|---|---|---|---|
| 1,974,019 | 9/1934 | Edwards | 99/348 X |
| 2,422,022 | 6/1947 | Koertge | 134/94 |
| 2,522,448 | 9/1950 | Husk et al. | 99/352 X |
| 2,570,628 | 10/1951 | Anetsberger | 99/408 |
| 2,939,383 | 6/1960 | Kanaga | 99/348 X |
| 3,466,997 | 9/1969 | Hartzog | 99/408 X |
| 3,831,294 | 8/1974 | Freze | 34/133 X |
| 3,942,426 | 3/1976 | Binks et al. | 99/473 |
| 3,972,318 | 8/1976 | Lenoir | 99/446 X |

FOREIGN PATENT DOCUMENTS 271879 1/1927 Fed. Rep. of Germany ............. 99/446

Primary Examiner—Harvey C. Hornsby
Assistant Examiner—Arthur O. Henderson
Attorney, Agent, or Firm—Bacon & Thomas

[57] ABSTRACT

Disclosed is a device for cooking food morsels in a gas-permeable rotating cylinder housed in a heat-insulated housing and flooded with a heated gas stream which enters at that place in the cylinder where the contents accumulate due to the rotation of the cylinder and the effect of gravity.

13 Claims, 3 Drawing Figures

DEVICE FOR COOKING FOODSTUFFS

This is a continuation of application Ser. No. 724,732, filed Sept. 20, 1976 now abandoned.

The invention refers to an appliance as described in the first section of the specifications, in keeping with West German Pat. No. 1 679 267.

West German Pat. No. 1 679 267 has as its object the cooking of cut-up foods, particularly potatoes, meat, and bread, by means of circulating hot gases; the foodstuffs are rotated in a horizontal gas-penetrable cylinder, which is flooded from the side by gas at a temperature between 80° C. and 400° C. and a velocity between approximately 3 m/sec and approximately 10 m/sec. The corresponding appliance consists of an insulated housing, a blower for circulating the gas, as well as a heating unit and a temperature regulator for the maintenance of the desired temperature; in addition, the housing is provided with at least one gas-penetrable cylinder which turns around a horizontal axle and is attached to a motor-force, for receiving the food to be cooked.

In keeping with West German Pat. No. 1 679 267, each cylinder is housed in a box- or canal-shaped metal container, so that in operation the gases can stream through it from the bottom to the top and transmit their heat to the foodstuffs within the cylinder. The gases are sucked at high velocity out of the box- or canal-shaped container from above and compressed down beside the heating units arranged next to the container, where they enter the container, which is open from below. The peripheral wall of each cylinder is permeable to gas and would best consist of a tightly meshed wire netting, interlaced or of punched metal, as the case might be.

The appliance is suited for preparing or cooking cut-up foodstuffs and has proved itself particularly in the cooking of French fries, thawing morsel-like frozen dishes, preparing toast, and the like.

The purpose of the invention is to improve upon the subject matter of West German Pat. No. 1 679 267 to the extent that greater quantities of heat can be transmitted to the food contents in the cylinder at temperatures lower than the maximum temperature at which a given food can be heated or cooked and in as short a time as possible. This problem is solved in the characterizing features given in the initial description. Further advantages of the invention are described in the remaining specifications.

One advantage of the invention is that the greater part of the heat-carrying gas that floods the cylinder does not flow by those portions of the cylinder that carry no pieces of food; rather, the stream of gas is directed in such a way that it almost completely floods the pieces of food in the cylinder. It enters the cylinder at the point where the entire contents accumulate, as determined by the direction of rotation of the cylinder and the effect of gravity on the foods within. In this way, pieces of meat, particularly, can be roasted quickly and entire raw potatoes can be rapidly cooked.

The following is a description of the device, with reference to the diagram, which shows schematically:

FIG. 1, a lateral cross-section, and

Figure 2:
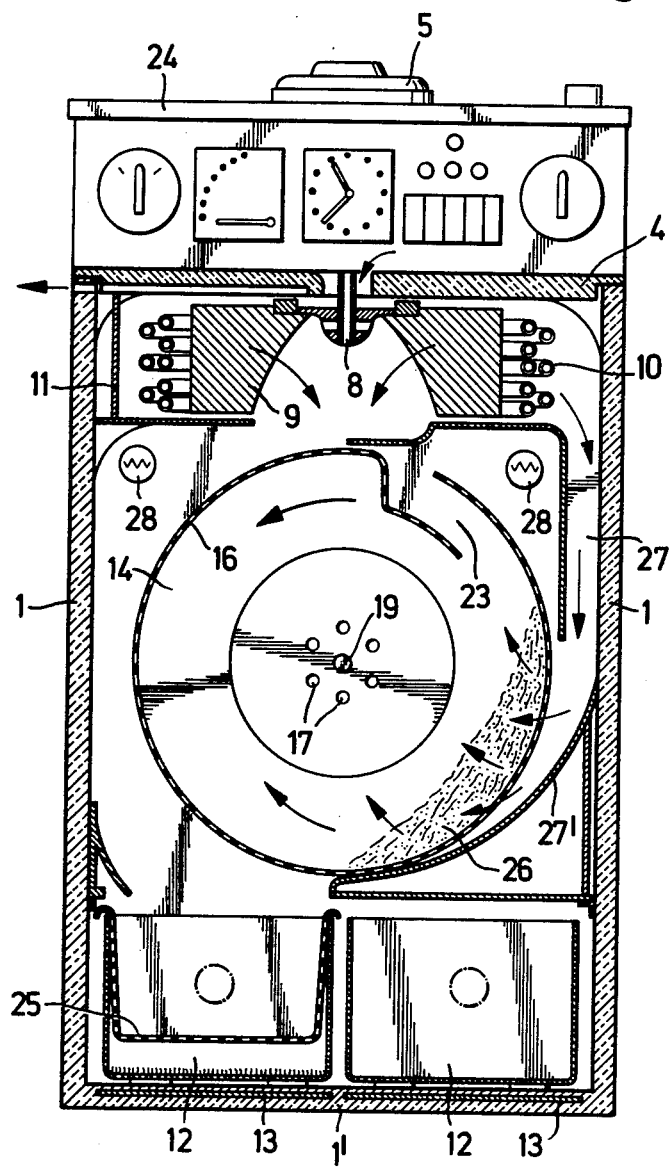
Figure 3:
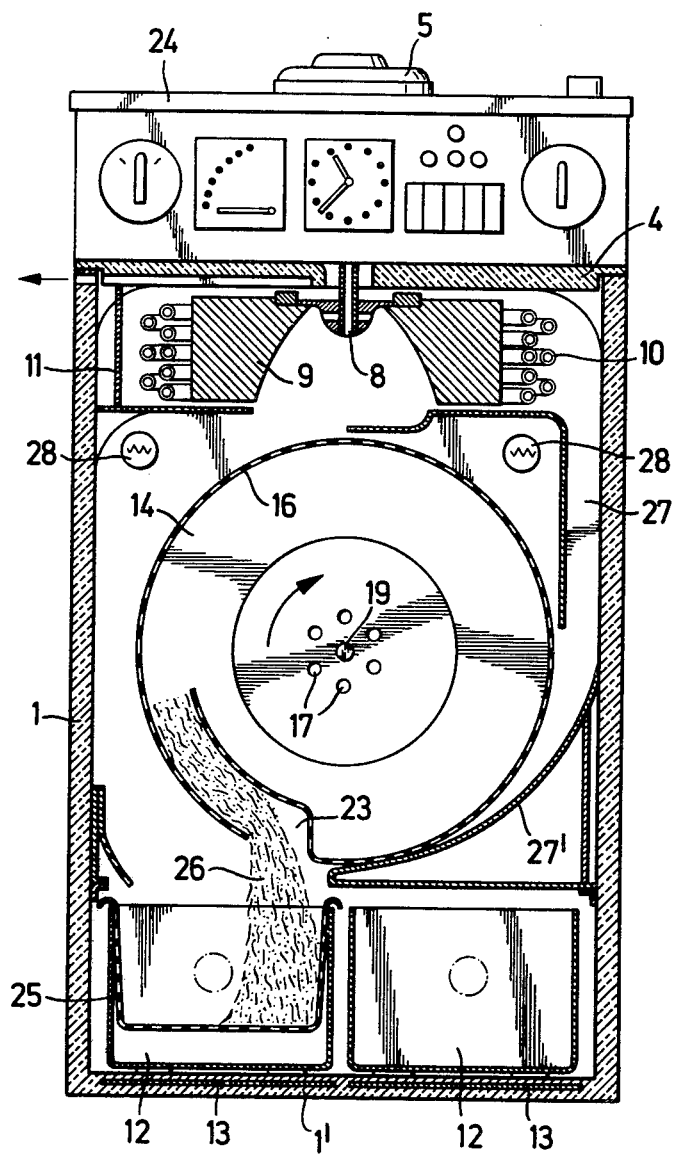

FIG. 2 and 3, frontal cross-sections during the cooking process and during the emptying of the cylinder after cooking, respectively.

The device has a metal housing 1 with a filling of insulating material between its inner and outer walls. On the front side of the housing 1 there is a folding door with, ideally, a round window 3 of Jena glass. An insulated plate is attached on top of the housing 1 and carries a fan motor 5, a reduction motor 6 and a side wall 7 on which are located the necessary control and surveillance instruments.

The fan motor 5 has a hollow shaft 8 which passes through the insulating plate and is attached to a fan 9 at the lower end. The hollow shaft 8 of the fan motor 5, whose inner bore exits below in the suction area of the fan 9, is used to introduce additional fresh, dry air—thereby improving the heating process—and also to cool the fan motor 5.

In addition to the fan, radiators 10 are located beneath the plate, as well as a deflector 11 which encloses the radiators 10 on three sides.

On the floor 1' of the housing 1 are two equally large, interchangeable containers or drawers 12 for receiving and keeping warm the cooked food. Beneath these drawers 12 are two sheets of metal 13 that can be drawn out and serve as a support for the drawers 12 and facilitate their exchange. The drawers 12 fit into openings beneath the door 2 in the front wall of the housing 1, as is clear from FIG. 1, in which the door 2 is represented in the open position and outlined in the closed position.

A gas-permeable cylinder 14, turning around a horizontal axle, fits between the fan 9 and the drawers 12 inside the housing 1. The cylinder 14 consists of two slightly conical sheets of metal 15 onto whose perimeter is welded the outer cylinder wall 16, made of wire netting or perforated metal. The metal sheets 15 extend radially somewhat beyond the cylinder side wall 16 and veer off so that the cylinder 14 can be rolled out on four rollers not shown in the diagram. The metal sheet 15 facing the door 2 has an opening in the middle, through which the cylinder 14 can be filled when the door is opened. The metal sheet 15 in the back has a circle of openings 17 into which fit a number of cogs 18 by means of which the cylinder 14 is put into motion. The cogs 18 are part of a rotating spindle 19, attached to which is a sprocket wheel 20. This is encircled by a chain 21 similar to a bicycle chain, which in turn encircles a toothed wheel 22 attached to the output spindle of the reduction motor 6. When the door 2 is in open position, the cylinder 14 can easily be drawn forward out of the housing 1, in the direction of the arrow in FIG. 1, to be cleaned, for example.

As is particularly clear in FIGS. 2 and 3, the outer wall 16 of the cylinder 14 has a discharge opening 23 that extends over the entire length of the wall 16. The shape and position of the discharge opening 23 are such that, during rotation of the cylinder 14 in a counter-clockwise direction, its contents cannot leave through the opening 23; instead, the contents of the cylinder 14 pile up at a particular spot, where they are flooded by the stream of gas as previously described. This is portrayed in FIG. 2. When, however, the rotational direction is reversed, the contents of the cylinder gather into the slot-like discharge opening 23 and fall out and into the container 12 beneath the opening 23. This emptying of the cylinder contents after completion of cooking, as shown in FIG. 3, takes place automatically when the direction of the cylinder's rotation is reversed. In addition, a device can be provided which regulates the time of cooking and reverses the direction of rotation when the cooking is completed.

The space above the plate 4, which is not insulated from the sides, is closed off at the top by a lid 24. If considerable quantities of fat run off in the period of cooking, as is the case for example in cooking streaked belly meat, the fat will drain into the left of the containers or drawers 12, as seen in FIGS. 2 and 3. The container 12 is provided with a grid-shaped insert 25 to prevent the food emptied into the container or drawer 12 from coming into further contact with the fat. The appliance has a second space for a container or drawer 12, in which the container 12 is kept warm by the channelling of hot air. This is the right container or drawer 12 in FIGS. 2 and 3.

FIG. 2 depicts the cooking of the food. It is essential that the food 26 be strongly permeated with hot air. As determined by the effect of gravity and the direction of rotation of the cylinder 14, the pieces of food 26 pile up at a particular place in the cylinder 14, as shown in FIG. 2. The hot air coming from the fan 9 and the radiators 10 is channelled down through a continually narrowing passage 27 to the place within the cylinder 14 where the food pieces 26 accumulate. In this way, the hot air is forced to stream into the small spaces within the relatively dense accumulation of food, which causes a high degree of heat exchange to take place. The periods of cooking are considerably shortened, for example by half of those aimed at by the appliance West German Pat. No. 1 679 267.

In the area where the hot air enters the cylinder 14, the passage 27 is bordered on the side opposing the cylinder 14 by a deflector 27' curved in such a way that it converges with the wall of the clinder so the passage 27 takes on a sickle-like shape, as viewed from the front in FIGS. 2 and 3, between the cylinder side wall 16 and the deflector 27'.

Within the housing 1, lights 28 are provided that facilitate observing, through the window 3, the cooking of the food pieces 26 within the cylinder 14 and the re-emptying of the cooked food 26 into the containers or drawers 12 as shown in FIG. 3.

The invention improves considerably on the proposals of West German Pat. No. 1 679 267. It has proved itself particularly in the cooking of potatoes in all forms, as well as cutlets and steaks, and is highly suited for preparing cut meats, drying sliced onions and cooking sausages and sausage-like foods. The appliance is easy to operate, makes possible the cooking of foods in the shortest possible time, and delivers food of outstanding quality.

In the model, the appliance is shown as it might be introduced into medium size kitchens. However, the invention can also be realized in appliances used in the industrial production of foods for mass consumption, such as French fries, chunks of meat, dried onions, and the like. Likewise, small appliances for household kitchens can be built according to the invention. In any case, the principle of flooding layers of food lying to the side with hot air led in from above, introduces a considerable improvement in performance.

I claim:

1. A device for cooking food which comprises:
an insulated housing;
a heat source;
a gas penetrable hollow cylinder adapted to receive and carry food while the food is being cooked, said cylinder being mounted within said housing for rotational movement in two opposite directions about a horizontal axis, said cylinder being constructed such that food accumulates at a generally fixed location on the interior of said gas penetrable cylinder when said cylinder is rotated in a first direction, said cylinder being further constructed such that it includes a permanently open food receiving and discharging slot-like opening extending along the longitudinal axis of said cylinder and arranged to permit the discharge of said food only during rotation of said cylinder in a second direction opposite to said first direction;
means for rotating said gas penetrable hollow cylinder in said two opposite directions, including means for reversing the rotational direction of said cylinder from said first to said second direction after the expiration of a defined cooking period; and
heat supply means for supplying a heated gas stream from said heat source to the inside of said hollow cylinder, comprising:
a downwardly directed passageway which places said heat source into communication with said cylinder such that heated gas is delivered to said generally fixed location on said cylinder where food accumulates when said cylinder is rotated in said first direction; said passageway being bordered at one end by an arcuate deflector arranged such that said deflector and the wall of said cylinder converge to reduce the cross section of said passageway in the vicinity of said fixed location to direct a flow of heated air towards said fixed location on said cylinder and into contact with said accumulated food to be cooked.

2. The device of claim 1 wherein said gas penetrable hollow cylinder is a perforated metal cylinder.

3. The device of claim 1 wherein said gas penetrable hollow cylinder is a wire mesh cylinder.

4. The device of claim 1 additionally comprising a removable receptical mounted in said housing for receiving the food morsels after cooking, arranged to receive food morsels falling by gravity through said permanently open slot-like opening during rotation of said cylinder in said second direction.

5. The device of claim 4 wherein said removable receptical is in communication with the heated gas stream.

6. The device as defined by claim 1 wherein said device additionally comprises a hollow-shafted fan which is arranged to supply additional air by virtue of a shaft in said fan having a bore leading into the suction area of the fan during operation.

7. A device for cooking food which comprises:
an insulated housing;
a heat source;
a gas penetrable hollow cylinder adapted to receive and carry food while the food is being cooked, said cylinder being mounted within said housing for rotational movement in two opposite directions about a horizontal axis, said cylinder being constructed such that food accumulates at a generally fixed location on the interior of said gas penetrable cylinder when said cylinder rotates, said cylinder being further constructed such that it includes a permanently open food receiving and discharging slot-like opening extending along the longitudinal axis of said cylinder and arranged to permit the discharge of said food only during rotation of said cylinder in a second direction opposite to said first direction;
means for rotating said gas penetrable hollow cylinder in said two opposite directions, including means for reversing the rotational direction of said cylinder from said first to said second direction after the expiration of a defined cooking period;

a container for collecting fat melting off the food being cooked; and heat supply means for supplying a heated gas stream from said heat source to the inside of said hollow cylinder, said heat supply means comprising: a passageway which places said heat source in fluid communication with said cylinder such that heated gas is delivered to said generally fixed location on said cylinder where food accumulates when said cylinder is rotated in said first direction; said passageway being bordered at one end by an arcuate deflector arranged such that said deflector and the wall of said cylinder converge to reduce the cross section of said passageway in the vicinity of said fixed location to direct a flow of heated air towards said fixed location on said cylinder and into contact with said accumulated food to be cooked, and said deflector also serving to direct melted fat into said container.

8. The device as defined by claim 7 wherein said container is provided with a grid insert.

9. A device for cooking food which comprises:

an insulated housing;

a heat source, arranged to produce a heated gas stream;

a gas penetrable hollow cylinder adapted to receive and carry food while the food is being cooked, said cylinder being mounted within said housing for rotational movement in two opposite directions about a horizontal axis, said cylinder being constructed such that food accumulates at a generally fixed location on one of the lower quarters of the interior of said gas penetrable cylinder when said cylinder is rotated in a first direction, said cylinder being further constructed such that it includes a permanently open food receiving and discharging slot-like opening extending along the longitudinal axis of said cylinder and arranged to permit the discharge of said food therethrough under the force of gravity only during rotation of said cylinder in a second direction opposite to said first direction;

means for rotating said gas penetrable hollow cylinder in said two opposite directions, including means for reversing the rotational direction of said cylinder from said first to said second direction after the expiration of a defined cooking period; and passageway means placing said heat source into communication with said cylinder such that heated gas is delivered to said generally fixed location on said cylinder where food accumulates when said cylinder is rotated in said first direction, said passageway means including an arcuate deflector which extends downwardly and about one side of said cylinder from near the top thereof to overlie said one lower quarter where food accumulates, said deflector and the wall of said cylinder converging from the top of said cylinder to the bottom thereof whereby to reduce the cross section of said passageway means in the vicinity of said one lower quarter, to direct a flow of heated air towards said one lower quarter and into contact with said accumulated food to be cooked;

the upper end of said passageway means being arranged to receive a heated gas stream from said heat source, and the lower end of said arcuate deflector terminating at about the bottom of said cylinder so that the other lower quarter of said cylinder is not covered thereby, whereby said slot-like permanent opening in said cylinder is unobstructed by said arcuate deflector when said opening is positioned generally in said other quarter of said cylinder so that food can be freely discharged from said cylinder during rotation of said cylinder in said second direction.

10. A device for cooking food as recited in claim 9, including additionally a removable receptical mounted in said housing below said other quarter of said cylinder, for receiving food morsels discharged through said slot-like permanent opening.

11. A device for cooking food as recited in claim 10, wherein said removable receptical is in communication with the heated gas stream.

12. A device for cooking food as recited in claim 9, wherein the lower end of said arcuate deflector is positioned generally above said removable receptical, whereby any fat melting off the food being cooked and flowing down said arcuate deflector is directed into said receptical.

13. A device for cooking food as recited in claim 12, wherein said container is provided with a grid insert.

* * * * *